(12) United States Patent
Zhan et al.

(10) Patent No.: US 11,336,660 B2
(45) Date of Patent: May 17, 2022

(54) METHODS AND APPARATUSES FOR IDENTIFYING REPLAY TRANSACTION BASED ON BLOCKCHAIN INTEGRATED STATION

(71) Applicant: ALIPAY (HANGZHOU) INFORMATION TECHNOLOGY CO., LTD., Zhejiang (CN)

(72) Inventors: Zongru Zhan, Hangzhou (CN); Jiang Wang, Hangzhou (CN); Xiaoli Liu, Hangzhou (CN); Zheng Cao, Hangzhou (CN); Fuxi Deng, Hangzhou (CN); Chao Zeng, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,891

(22) Filed: Jun. 29, 2021

(65) Prior Publication Data

US 2021/0326863 A1 Oct. 21, 2021

(30) Foreign Application Priority Data

Jul. 8, 2020 (CN) .......................... 202010653796.6

(51) Int. Cl.
*H04L 29/06* (2006.01)
*G06Q 20/38* (2012.01)
(Continued)

(52) U.S. Cl.
CPC ....... *H04L 63/1408* (2013.01); *G06Q 20/389* (2013.01); *H04L 9/088* (2013.01); *H04L 9/30* (2013.01)

(58) Field of Classification Search
CPC ....... H04L 63/1408; H04L 9/30; H04L 9/088; H04L 2209/38; G06Q 20/389
See application file for complete search history.

(56) References Cited

U.S. PATENT DOCUMENTS 9,071,589 B1 6/2015 Patnala et al.
10,181,948 B1 1/2019 Nenov et al.
(Continued)

FOREIGN PATENT DOCUMENTS

CN 102624726 8/2012
CN 102739473 10/2012
(Continued)

OTHER PUBLICATIONS

U.S. Appl. No. 17/362,974, filed Jun. 29, 2021, Wang et al.
(Continued)

*Primary Examiner* — Sarah Su
(74) *Attorney, Agent, or Firm* — Fish & Richardson P.C.

(57) ABSTRACT

Computer-implemented methods, apparatuses, and system for processing transactions using a blockchain integrated station are provided. The blockchain integrated station includes a central processing unit (CPU) and an intelligent network card. The intelligent network card includes a processor different from the CPU. The intelligent network card is coupled with one or more caches. The blockchain integrated station serves as a blockchain node of a blockchain network. The intelligent network card is configured to receive a transaction of the blockchain network; identify the transaction as a replay transaction by operations comprising: comparing the transaction with historically received transactions in the one or more caches; and in response to a comparison result indicates that the transaction is the same as one of the historically received transactions, determining the transaction as a replay transaction.

20 Claims, 7 Drawing Sheets

When a blockchain integrated station receives a transaction through an intelligent network card, the intelligent network card compares a currently received transaction with historically-received transactions in a network card cache — S600

If a comparison result indicates that there is a historically-received transaction the same as the currently received transaction, the intelligent network card determines the currently received transaction as a replay transaction — S602

(51) Int. Cl.
*H04L 9/08* (2006.01)
*H04L 9/30* (2006.01)

(56) References Cited

U.S. PATENT DOCUMENTS

| | | | |
|---|---|---|---|
| 10,785,035 B1* | 9/2020 | Lv | H04L 9/3247 |
| 10,791,143 B1* | 9/2020 | Lv | H04L 9/3239 |
| 11,150,963 B2 | 10/2021 | Nainar et al. | |
| 2004/0095883 A1* | 5/2004 | Chu | H04L 47/193 370/235 |
| 2006/0015715 A1* | 1/2006 | Anderson | H04L 63/1408 713/154 |
| 2010/0121947 A1 | 5/2010 | Pirzada et al. | |
| 2012/0102098 A1 | 4/2012 | Guillou et al. | |
| 2015/0127509 A1 | 5/2015 | Studnitzer et al. | |
| 2017/0149819 A1* | 5/2017 | Androulaki | H04L 9/3236 |
| 2018/0018663 A1 | 1/2018 | Van et al. | |
| 2018/0173747 A1 | 6/2018 | Baird, III | |
| 2018/0288126 A1 | 10/2018 | Smart et al. | |
| 2018/0315055 A1* | 11/2018 | Pickover | H04L 9/3297 |
| 2019/0018887 A1 | 1/2019 | Madisetti et al. | |
| 2019/0026146 A1* | 1/2019 | Peffers | G06F 9/5044 |
| 2019/0236565 A1* | 8/2019 | Song | G06Q 20/3678 |
| 2019/0289031 A1* | 9/2019 | Kozloski | H04L 63/1416 |
| 2019/0296915 A1* | 9/2019 | Lancashire | G06Q 20/3825 |
| 2019/0370486 A1* | 12/2019 | Wang | G06F 21/6227 |
| 2020/0005292 A1 | 1/2020 | Mao et al. | |
| 2020/0013025 A1* | 1/2020 | Verma | H04L 9/3297 |
| 2020/0099512 A1 | 3/2020 | Kikinis | |
| 2020/0111105 A1 | 4/2020 | Gupta et al. | |
| 2020/0112427 A1 | 4/2020 | Nakamura et al. | |
| 2020/0127861 A1* | 4/2020 | Doshi | G06F 9/544 |
| 2020/0128043 A1* | 4/2020 | Xie | H04L 63/1416 |
| 2020/0128044 A1* | 4/2020 | Xie | H04L 63/126 |
| 2020/0134737 A1* | 4/2020 | Wang | G06Q 20/385 |
| 2020/0136901 A1 | 4/2020 | Ballard et al. | |
| 2020/0136998 A1 | 4/2020 | Lu | |
| 2020/0142986 A1 | 5/2020 | Ragnoli et al. | |
| 2020/0153605 A1 | 5/2020 | Hu et al. | |
| 2020/0175509 A1 | 6/2020 | Qi | |
| 2020/0250633 A1 | 8/2020 | Vinson et al. | |
| 2020/0278892 A1 | 9/2020 | Nainar et al. | |
| 2020/0304326 A1* | 9/2020 | Xie | H04L 9/002 |
| 2020/0314011 A1 | 10/2020 | Deval et al. | |
| 2020/0409952 A1 | 12/2020 | Dean et al. | |
| 2021/0117249 A1 | 4/2021 | Doshi et al. | |
| 2021/0211467 A1 | 7/2021 | Naeimi et al. | |
| 2021/0326887 A1 | 10/2021 | Zhan et al. | |
| 2021/0328810 A1 | 10/2021 | Wang et al. | |
| 2021/0329093 A1 | 10/2021 | Zhan et al. | |
| 2021/0344753 A1* | 11/2021 | Zhan | H04L 9/12 |

FOREIGN PATENT DOCUMENTS

| | | |
|---|---|---|
| CN | 102904730 | 1/2013 |
| CN | 104410617 | 3/2015 |
| CN | 205880913 | 1/2017 |
| CN | 106991607 | 7/2017 |
| CN | 107147735 | 9/2017 |
| CN | 107273213 | 10/2017 |
| CN | 107450981 | 12/2017 |
| CN | 108648078 | 10/2018 |
| CN | 108701187 | 10/2018 |
| CN | 108881120 | 11/2018 |
| CN | 109245926 | 1/2019 |
| CN | 109255661 | 1/2019 |
| CN | 109284185 | 1/2019 |
| CN | 109299335 | 2/2019 |
| CN | 109656855 | 4/2019 |
| CN | 109709589 | 5/2019 |
| CN | 109872161 | 6/2019 |
| CN | 109936513 | 6/2019 |
| CN | 109960671 | 7/2019 |
| CN | 110071876 | 7/2019 |
| CN | 110084604 | 8/2019 |
| CN | 110213058 | 9/2019 |
| CN | 110383279 | 10/2019 |
| CN | 110677402 | 1/2020 |
| CN | 110999214 | 4/2020 |
| CN | 109408523 | 6/2020 |
| CN | 111241201 | 6/2020 |
| CN | 111262868 | 6/2020 |
| CN | 111262924 | 6/2020 |
| CN | 111327603 | 6/2020 |
| CN | 111541789 | 8/2020 |
| CN | 111541727 | 10/2020 |
| CN | 111541783 | 10/2020 |
| CN | 111541788 | 10/2020 |
| CN | 111738859 | 10/2020 |
| CN | 111539829 | 12/2020 |
| CN | 111541725 | 4/2021 |
| CN | 112667748 | 4/2021 |
| CN | 111541726 | 5/2021 |
| CN | 111541785 | 5/2021 |
| CN | 111538996 | 6/2021 |
| CN | 111541552 | 6/2021 |
| CN | 111541724 | 6/2021 |
| CN | 111541784 | 7/2021 |
| CN | 111541553 | 8/2021 |
| CN | 113364847 | 9/2021 |
| EP | 3432146 | 1/2019 |
| EP | 3496332 | 6/2019 |
| EP | 3591931 | 1/2020 |
| WO | WO 2019072312 | 4/2019 |
| WO | WO 2019137563 | 7/2019 |
| WO | WO 2019229612 | 12/2019 |

OTHER PUBLICATIONS

U.S. Appl. No. 17/362,941, filed Jun. 29, 2021, Zhan et al.
U.S. Appl. No. 17/362,444, filed Jun. 29, 2021, Zhan et al.
U.S. Appl. No. 17/362,327, filed Jun. 29, 2021, Zhan et al.
BiFuWa, "BlockChain + Chips: China's Chip Dilemma is Broken by Speculating Coins," JianShu, May 12, 2018, 10 pages (with English machine translation).
EP Extended Search Report in European Application No. 21181100.5, dated Nov. 23, 2021, 11 pages.
EP Extended Search Report in European Application No. 21181645.9, dated Nov. 30, 2021, 7 pages.
EP Extended Search Report in European Application No. 21181659.0, dated Dec. 1, 2021, 6 pages.
EP Extended Search Report in European Application No. 21182218.4, dated Dec. 7, 2021, 11 pages.
EP Extended Serach Report in European Application No. 21179739.4, dated Dec. 20, 2021, 8 pages.
Mahony et al, "A Systematic Review of Blockchain Hardware Acceleration Architectures", IEEE Xplore, Jun. 17, 2019, 6 pages.
Sakakibara et al, "Accelerating Blockchain Transfer System Using FPGA-Based NIC", IEEE Xplore, Dec. 11, 2018, 8 pages.

* cited by examiner

```
┌─────────────────────────────────────────────────────────────┐
│ When a blockchain integrated station receives a transaction │
│ through an intelligent network card, the intelligent         │─ S500
│ network card determines other to-be-forwarded nodes          │
└─────────────────────────────────────────────────────────────┘
                              │
                              ▼
┌─────────────────────────────────────────────────────────────┐
│ The intelligent network card forwards the transaction to     │─ S502
│ other to-be-forwarded nodes                                  │
└─────────────────────────────────────────────────────────────┘
```

FIG. 5

```
┌─────────────────────────────────────────────────────────────┐
│ When a blockchain integrated station receives a transaction  │
│ through an intelligent network card, the intelligent network │─ S600
│ card compares a currently received transaction with          │
│ historically-received transactions in a network card cache   │
└─────────────────────────────────────────────────────────────┘
                              │
                              ▼
┌─────────────────────────────────────────────────────────────┐
│ If a comparison result indicates that there is a             │
│ historically-received transaction the same as the currently  │─ S602
│ received transaction, the intelligent network card           │
│ determines the currently received transaction as a replay    │
│ transaction                                                  │
└─────────────────────────────────────────────────────────────┘
```

METHODS AND APPARATUSES FOR IDENTIFYING REPLAY TRANSACTION BASED ON BLOCKCHAIN INTEGRATED STATION

CROSS-REFERENCE TO RELATED APPLICATIONS

This application claims priority to Chinese Patent Application No. 202010653796.6, filed on Jul. 8, 2020, which is hereby incorporated by reference in its entirety.

TECHNICAL FIELD

The present disclosure relates to the field of information technologies, and in particular to, methods and apparatuses for identifying a replay transaction based on a blockchain integrated station.

BACKGROUND

Blockchain technology (also referred to as distributed ledger technology) is a decentralized distributed database technology having characteristics such as publicity, transparency, immutability and trustability, and thus it is applicable to many application scenarios with high demands for data reliability.

In an actual operation process of a blockchain network, replay attacks may be encountered. The replay attack refers to that a particular node repeatedly submits a transaction due to malice or technical failure, thus causing the blockchain network to repeatedly execute the same transaction. Therefore, computing power of the blockchain network is wasted, and other losses may be caused.

Based on the exited technology, a more efficient method for identifying a replay transaction is needed.

SUMMARY

To solve a problem that the existing method for identifying a replay transaction has a low efficiency, embodiments of the present disclosure provide methods and apparatuses for identifying a replay transaction based on a blockchain integrated station. The technical solutions are described below.

According to a first aspect of the embodiments of the present disclosure, provided is a method for identifying a replay transaction based on a blockchain integrated station. The blockchain integrated station includes a central processing unit CPU and an intelligent network card, and the blockchain integrated station is any node of a blockchain network. The method includes:

when the blockchain integrated station receives a transaction through the intelligent network card, identifying, by the intelligent network card, a currently received transaction, which includes:

comparing the currently received transaction with historically received transactions in a network card cache;

if a comparison result indicates that there is a historically received transaction the same as the currently received transaction, determining the currently received transaction as the replay transaction.

According to a second aspect of the embodiments of the present disclosure, provided is an apparatus for identifying a replay transaction based on a blockchain integrated station. The apparatus is applied to an intelligent network card of the blockchain integrated station. The blockchain integrated station further includes a CPU, and the blockchain integrated station is any node of a blockchain network. The apparatus includes:

an identifying module, configured to, when the blockchain integrated station receives a transaction through the intelligent network card, identify a currently received transaction, which comprises: comparing the currently received transaction with historically received transactions in a network card cache; and when a comparison result indicates that there is a historically received transaction the same as the currently received transaction, determining the currently received transaction as the replay transaction.

In the technical solutions according to the embodiments of the present disclosure, the blockchain integrated station includes a CPU and an intelligent network card, and the intelligent network card is a network card having a built-in processor or microprocessor and can perform data computing and processing. The intelligent network card can replace the CPU to identify a replay transaction.

The following technical effects can be achieved according to the embodiments of the present disclosure.

1. The intelligent network card is specifically in charge of identifying a replay transaction to offload this operation burden for the CPU, thereby improving the operation efficiency of the blockchain integrated station serving as a node. In this case, the CPU can also execute more transactions within a unit time, thereby improving its throughput.

2. The replay transaction can be identified and filtered at the intelligent network card and thus the replay transaction generally will not flow through the CPU, so that the replay transaction is identified and filtered more rapidly.

It should be understood that the above-mentioned general descriptions and the below detailed descriptions are merely examples and explanatory, and are not intended to limit the embodiments of the present disclosure.

In addition, any of the embodiments of the present disclosure is not required to achieve all effects described above.

BRIEF DESCRIPTION OF DRAWINGS

To describe the technical solutions in the embodiments of the present disclosure or in the exited technology more clearly, drawings needed in descriptions of the embodiments of the present disclosure or the exited technology will be briefly introduced below. It is clear that the drawings described below are merely some embodiments of the present disclosure and other drawings can also be obtained by those of ordinary skill in the art based on these drawings.

DESCRIPTION OF EMBODIMENTS

In the early stage of development of the blockchain technology, users mostly add their own personal computer (PC) and laptop computer and the like into a blockchain network to become a blockchain node in the blockchain network. At this time, the stage can be called 1.0 architecture era of blockchain network, in which the behaviors of users to participate in the blockchain network are autonomous and the users also need to perform autonomous maintenance, for example, perform maintenance and configuration and so on for their devices (for example, PC) participating in the blockchain network. Along with continuous development of the blockchain technology, especially along with increasing needs of users for infrastructures with high performance and high availability, the blockchain network develops into 2.0 architecture era based on cloud service. In the 2.0 architecture era, cloud service providers provide the infrastructures with high performance and high availability to the users based on higher-performance servers and cloud computing, so as to configure and form blockchain nodes needed by the users. To satisfy the needs of users for privatization and security and the like of the blockchain network, it is necessary to perform further architecture upgrade to the blockchain network, thereby realizing 3.0 architecture era based on blockchain integrated station.

Software and hardware integration can be realized for the blockchain integrated station. When providing a blockchain integrated station, a provider will not only provide hardware devices of the blockchain integrated station to users but also provide software configurations for realizing deep optimizations of the hardware devices integrated into the blockchain integrated station, thereby realizing the software-hardware integration.

Hardware optimization can be realized for the blockchain integrated station. For example, a dedicated smart contract processing chip can be deployed on the blockchain integrated station. For example, the smart contract processing chip can be Field Programmable Gate Array (FPGA) chip, or another type of chip to increase the processing efficiency for a smart contract. A hardware root-of-trust key can be deployed on the smart contract processing chip, for example, the hardware root-of-trust key can be pre-programmed by the provider into the smart contract processing chip and the provider can also know a public key corresponding to the hardware root-of-trust key (for example, the key is disclosed). Therefore, the smart contract processing chip can send negotiation information to the provider and sign the negotiation information by using the hardware root-of-trust key, so that the provider can verify the signature based on the corresponding public key; and, after successful signature verification, it is ensured that the smart contract processing chip and the provider obtain the same key through negotiation based on the negotiation information. The negotiated key can include an image deployment key, and thus the provider can encrypt and transmit a binary disk image needed by the blockchain node to the smart contract processing chip based on the image deployment key, and the smart contract processing chip can decrypt and deploy the binary disk image based on the image deployment key. The negotiated key can include a service secret deployment key, and thus the provider can encrypt and transmit a node private key of the blockchain node, a service root key of the blockchain node, etc., to the smart contract processing chip based on the service secret deployment key, and the smart contract processing chip can obtain and deploy the node private key and the service root key and the like based on the service secret deployment key to satisfy the privacy transaction needs in a blockchain scenario. For example, the node private key corresponds to a node public key, and thus a client device can perform encryption and transmission for a blockchain transaction by using the node public key, and the blockchain node can perform decryption by using the node private key. The service root key is a symmetric key which can be used to perform encrypted storage for service data such as contract codes and value of contract status and the like. The service root key may not be directly used, and the smart contract processing chip can perform encryption and decryption through a derivation key of the service root key to reduce the security risk of the service root key. Through reliable management for the node private key and the service root key (or its derivation key), data will be always in encrypted state unless processed by the smart contract processing chip. Therefore, the smart contract processing chip actually forms a Trusted Execution Environment (TEE) of hardware on the blockchain integrated station, so as to ensure the data needing privacy protection such as transactions, contract codes, and contract statuses will not be leaked.

For another example, an intelligent network card can be deployed on the blockchain integrated station. In addition to realizing a traditional network card function, the intelligent network card also can replace or assist a CPU of the blockchain integrated station to perform partial functions so as to offload computation of the CPU. Especially, the operations with intensive network I/O can be transferred from CPU to the intelligent network card to perform, so that the CPU can process more computation-intensive operations, for example, transaction execution, and storage processing and the like. Compared with other components (for example, CPU) on the blockchain integrated station, the intelligent network card is closer to the network regardless of physical level or logical level, so the intelligent network card can always obtain data transmitted in the network preferentially. Therefore, with no storage access or a small amount of storage access is involved, the intelligent network card can process these data with a relatively higher processing efficiency and a relatively smaller delay, and a relatively larger throughput, so as to achieve a higher performance benefit with a lower cost. For example, in consensus algorithm, there is almost no need to access storage except in the cases of change of network status, addition and deletion of node, change of consensus configuration and the like. Therefore, the consensus operation can be completed by the intelligent network card and only need to inform the CPU of a consensus result. Therefore, the CPU is not needed to directly participate in the consensus process, thereby significantly improving the consensus efficiency. Similarly, the same effect can be achieved in forwarding transactions by the intelligent network card and achieving block synchronization by the intelligent network card on a newly-added blockchain node and the like and will not be repeated herein. Furthermore, after receiving transactions, the intelligent network card can identify or filter out a replay transaction by comparing the received transaction with historical transactions, for example, comparing data fields of sender information of transaction, destination address, time stamp, and hash value and the like. The intelligent network card can also perform content analysis for those received transactions, so as to filter out illegal transactions or predefined undesired transactions and the like as a supplementation to layer-2 or layer-3 packet filtering implemented by a switch.

For another example, a cryptographic acceleration card which is also called a high-speed cryptographic card can be deployed on the blockchain integrated station. The cryptographic acceleration card can realize total encrypted memory, defend against side-channel attacks by hardware reinforcement, and also realize physical protection against approaches such as probe, laser and the like, having very high security. For example, the cryptographic acceleration card used on the blockchain integrated station can have level-2 qualification from the State Cryptography Administration, level-3 qualification from the State Cryptography Administration and the like. When the cryptographic acceleration card is deployed, the hardware roof-of-trust key as described above can be maintained in the cryptographic acceleration card, and the cryptographic acceleration card can perform signature operation based on the hardware roof-of-trust key and replace or assist the smart contract processing chip to complete the operations such as the key negotiation as described above. Similarly, the cryptographic acceleration card can be used to maintain a public key so that the cryptographic acceleration card can realize signature verification operation based on the maintained public key. In short, at least part of operations relating to key management, encryption and decryption, and signature verification and the like on the blockchain integrated station can be handed over to the cryptographic acceleration card, so that very high security can be realized and task offloading can be realized for the CPU of the blockchain integrated station or the smart contract processing chip, thereby improving the processing efficiency.

Software optimization can be realized for the blockchain integrated station. For example, a certificate authority service can be built in the blockchain integrated station to realize automatic certificate issuing, node identity authentication, automatic blockchain construction, and automatic adding of blockchain node, thereby realizing the plug and play of the blockchain integrated station. In this case, a user can realize fast deployment of the blockchain integrated station. In addition to quickly establishing a private blockchain network among a plurality of blockchain integrated stations, the blockchain integrated station can integrate a standardized on-cloud service interface to enable the blockchain integrated station to automatically connect to on-cloud service, thereby realizing hybrid deployment between the blockchain integrated station and the cloud-deployed blockchain node to construct a hybrid blockchain network. The blockchain integrated station can also integrate a standardized cross-chain service interface to enable the blockchain integrated station to realize cross-chain services based on a standardized cross-chain protocol or standardized cross-chain service, thereby greatly expanding the application scenarios of the blockchain integrated station, and satisfying the cross-chain needs of users. For example, cross-chain data interaction between different blockchain networks is achieved, and for another example, cross-chain data interaction between the blockchain network and an off-chain computing node and the like is achieved (for example, the off-chain computing node shares computation task for the blockchain node and the like).

The technical solution according to each embodiment of the present disclosure will be described in detail below in combination with the drawings.

Figure 1:
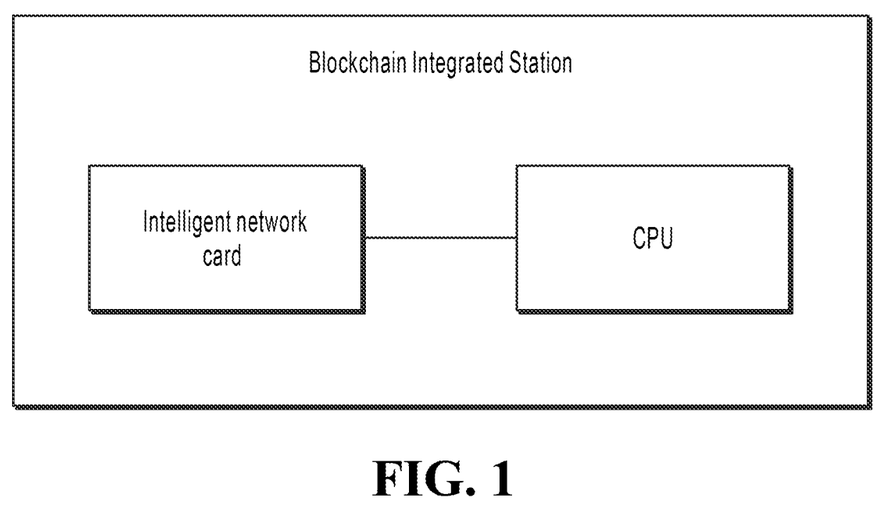
FIG. 1 is a structural schematic diagram of a blockchain integrated station according to embodiments of the present disclosure.

FIG. 1 is a structural schematic diagram of a blockchain integrated station according to embodiments of the present disclosure. As shown in FIG. 1, the blockchain integrated station includes a Central Processing Unit (CPU) and an intelligent network card. Different from a traditional network card only supporting network communication, the intelligent network card of the present disclosure is a network card with a built-in processor or microprocessor (e.g., an ARM processor), and thus has certain data computing and processing capability. Certainly, it can be understood that the blockchain integrated station as a node of a blockchain network also includes a memory not shown in FIG. 1. The memory is used to store a blockchain itself, or the memory is also used to store a state database for an Ethereum blockchain.

In addition, the blockchain integrated station can further include other hardware, such as a smart contract processing chip and a cryptographic acceleration card.

Figure 2:
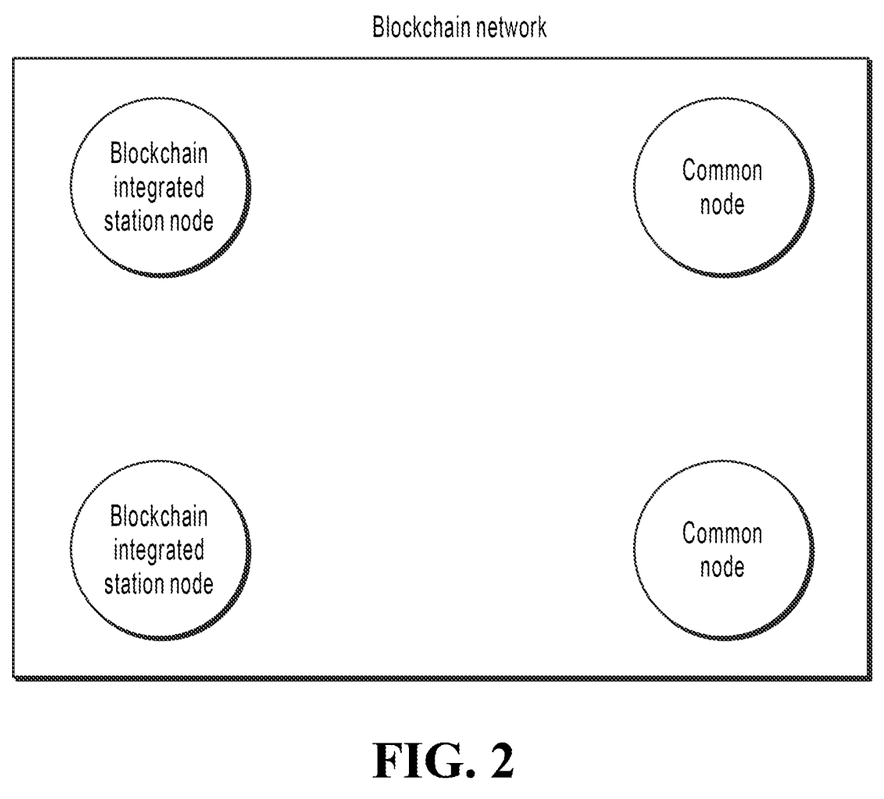
FIG. 2 is a structural schematic diagram of a blockchain system according to embodiments of the present disclosure.

FIG. 2 is a structural schematic diagram of a blockchain system according to embodiments of the present disclosure. The blockchain system includes blockchain network. In the blockchain network, at least one node can serve as a blockchain integrated station. That is, the blockchain integrated station as a node can interact with other nodes (common nodes) which are not blockchain integrated stations, or can interact with other nodes which are also blockchain integrated stations. For convenience of description, the technical solutions will be described with a single blockchain integrated station herein.

Figure 3:
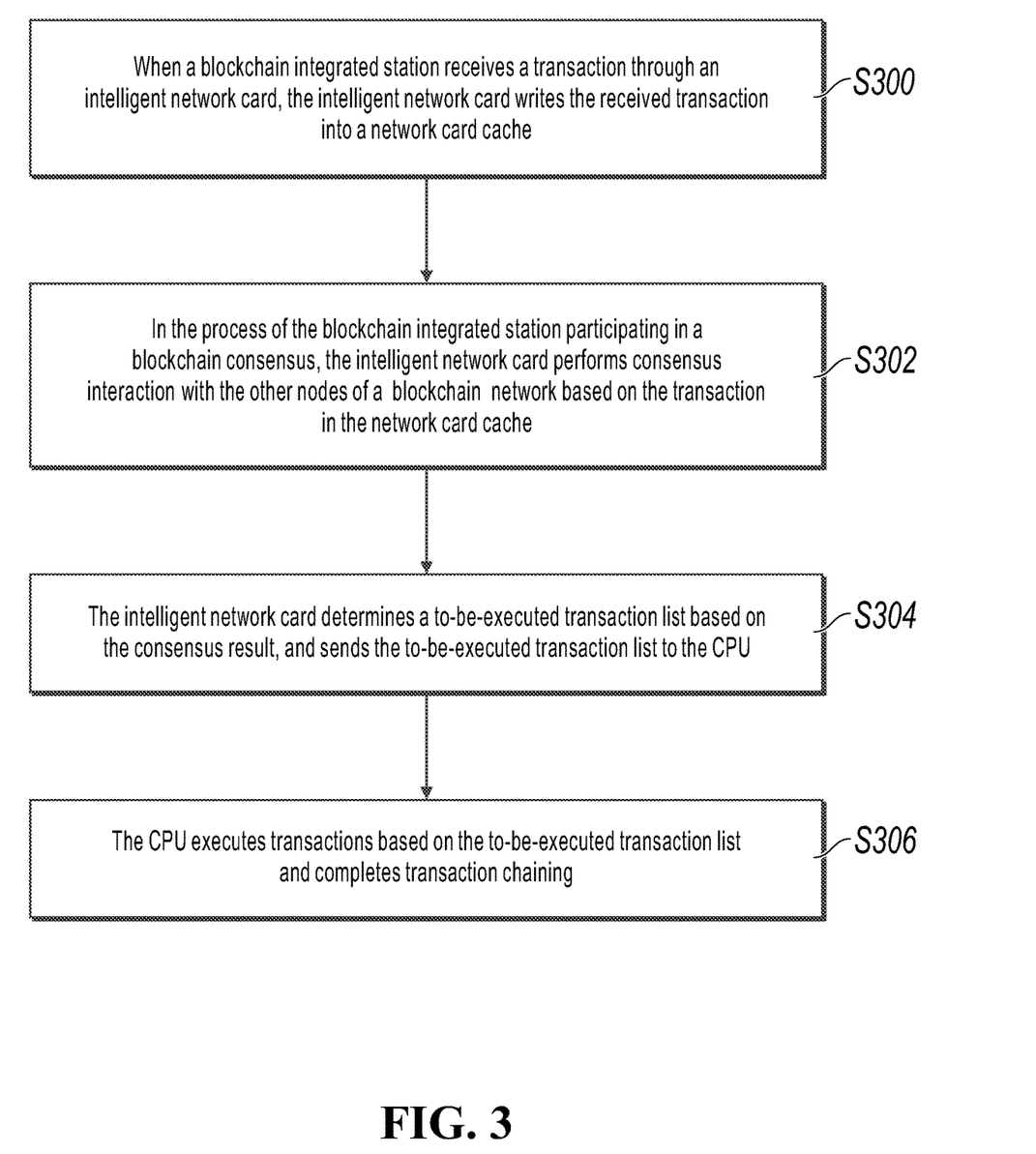
FIG. 3 is a flowchart of a method for processing a transaction based on a blockchain integrated station according to embodiments of the present disclosure.

FIG. 3 is a flowchart of a method for processing a transaction based on a blockchain integrated station according to embodiments of the present disclosure. The method includes the following steps.

At step S300, when the blockchain integrated station receives a transaction through an intelligent network card, the intelligent network card writes the received transaction into a network card cache.

It is well known that blockchain network usually processes a transaction in three stages, i.e. a transaction reception stage, a consensus stage and a transaction execution and chaining stage. Firstly, the above-mentioned three stages will be briefly introduced herein.

In the transaction reception stage, each node in the blockchain network receives and caches a transaction to prepare for subsequent consensus and transaction execution. Specifically, a client device constructs a transaction and submits the transaction to any node in the blockchain network, so that the node directly receives and caches the transaction, and broadcasts the transaction to the entire network to enable other nodes to indirectly receive the transaction. The blockchain integrated station receiving the transaction through the intelligent network card at step 300 can refer to that the blockchain integrated station directly receives the transaction, or the blockchain integrated station indirectly receives the transaction. In summary, regardless of direct reception or indirect reception, it is important that most nodes in the blockchain network card will cache the same transaction. It can be understood that in an actual application, a small number of nodes may not receive the transaction due to shutdown or network problem, which, however, will not affect the operation of a distributed blockchain network.

In the consensus stage, various nodes of the blockchain network perform interaction based on a consensus algorithm (e.g., Byzantine fault tolerance algorithm) to achieve message consistency, that is, to reach a consensus on which received transactions are to be executed this time. It can be understood that in the actual application, not every node participates in the consensus. However, since the consensus algorithm has fault tolerance, a consensus result will not be affected.

In the transaction execution and chaining stage, each node will obtain a transaction from the cache for execution based on the consensus result, and the obtained transaction is then packaged into a block and written into the blockchain (i.e., transaction chaining) after execution.

The cache introduced above usually refers to a cache of a CPU of a node. In the embodiments of the present disclosure, since an intelligent network card is configured for the node, the cache can include a network card cache and a CPU cache. In the transaction reception stage, the intelligent network card writes a transaction into the network card cache so as to perform subsequent blockchain consensus based on the transaction in the network card cache.

At step S302, in the process of the blockchain integrated station participating in the blockchain consensus, the intelligent network card performs consensus interaction with other nodes of the blockchain network based on the transaction in the network card cache.

In the consensus stage, the intelligent network card replaces the CPU to actually participate in the consensus and perform consensus interaction with other nodes. Network traffic generated in the consensus process directly enters the intelligent network card, and the intelligent network card processes the network traffic based on the consensus algorithm and directly feeds back a processing result. Therefore, the network traffic will not flow through the CPU.

At step S304, the intelligent network card determines a to-be-executed transaction list based on the consensus result, and sends the to-be-executed transaction list to the CPU.

It is well known that the blockchain network performs consensus repeatedly according to a particular consensus trigger condition. For example, the consensus trigger condition can be that one consensus is performed every ten minutes, which means that the blockchain network determines one batch of to-be-executed transactions every ten minutes, and packages this batch of to-be-executed transactions into a block for chaining. The consensus result actually refers to those to-be-executed transactions determined in one blockchain consensus.

It should be noted herein that access operation for blockchain storage (blockchain and state database) generally needs to be performed by the CPU for efficiency. In an actual application, Practical Byzantine Fault Tolerance (PBFT) algorithm is usually adopted, but it is not needed to access the blockchain storage (blockchain and state database) for a host change operation involved in the PBFT algorithm process. Therefore, the CPU neither actually participates in the consensus process nor adversely affects efficiency of storage access.

Specifically, the to-be-executed transaction list described at step S304 can be a list formed by the to-be-executed transactions determined by the present blockchain consensus, or can be a list formed by transaction identifiers (e.g., transaction hashes) of the to-be-executed transactions determined by the present blockchain consensus.

When the to-be-executed transaction list includes transaction hashes, the intelligent network card also needs to send the to-be-executed transactions to the CPU. In an actual application, the intelligent network card can send the received transactions to the CPU while writing the received transactions into the network card cache in the transaction reception stage. The CPU writes the received transactions into the CPU cache.

At step S306, the CPU executes transactions based on the to-be-executed transaction list and completes transaction chaining.

In embodiments of the present disclosure, in the process that the blockchain integrated station participates in the blockchain consensus, the intelligent network card sends consensus configuration modification information to the CPU if receiving the consensus configuration modification information. The CPU can modify a consensus configuration locally stored in the blockchain integrated station based on the consensus configuration modification information.

Since it is needed to access the blockchain storage for the operation of modifying the consensus configuration (for example, adding or deleting node; for another example, determining a capacity size of one batch of to-be-executed transactions, i.e. a batch size, in one consensus), the operation needs to be performed by the CPU for efficiency of storage access. Normally, if the modification of consensus configuration is not involved in the consensus process, the CPU will not participate in the consensus.

In addition, execution results generated by the CPU by executing transactions based on the to-be-executed transaction list are returned to the intelligent network card, and these execution results are reference information needed by the intelligent network card for participation in the next consensus. For example, the CPU executes a transaction initiated by an account A, which consumes 100 GAS of the account A with only 50 GAS left in the account A. This means that the account A cannot provide sufficient GAS for other transactions initiated by the account A. In this case, the CPU sends this execution result to the intelligent network card, and the intelligent network card will not tend to determine other transactions initiated by the account A as to-be-executed transactions in the next consensus.

According to the method shown in FIG. 3, the blockchain integrated station includes a CPU and an intelligent network card, and the intelligent network card is a network card having a built-in processor or microprocessor and can perform data computing and processing. The intelligent network card replaces the CPU to actually participate in a blockchain consensus on behalf of the blockchain integrated station, and sends a to-be-executed transaction list to the CPU for transaction execution and transaction chaining based on the present consensus result.

According to the embodiments of the present disclosure, the following technical effects can be achieved by transferring operations such as blockchain consensus that needs frequent network interaction with other nodes from the CPU to the intelligent network card.

1. The intelligent network card is specifically in charge of blockchain consensus, while the CPU focuses on transaction execution and transaction chaining. In this case, the operation efficiency of the blockchain integrated station serving as a node can be improved, and the CPU can also execute more transactions within a unit time, thereby improving throughput.

2. In a blockchain consensus process, the network traffic does not need to flow through the CPU but is received by the intelligent network card for direct processing and feedback. Thus, the CPU does not participate in the consensus process, so that the feedback delay of the blockchain integrated station in the consensus process is reduced.

Figure 4:
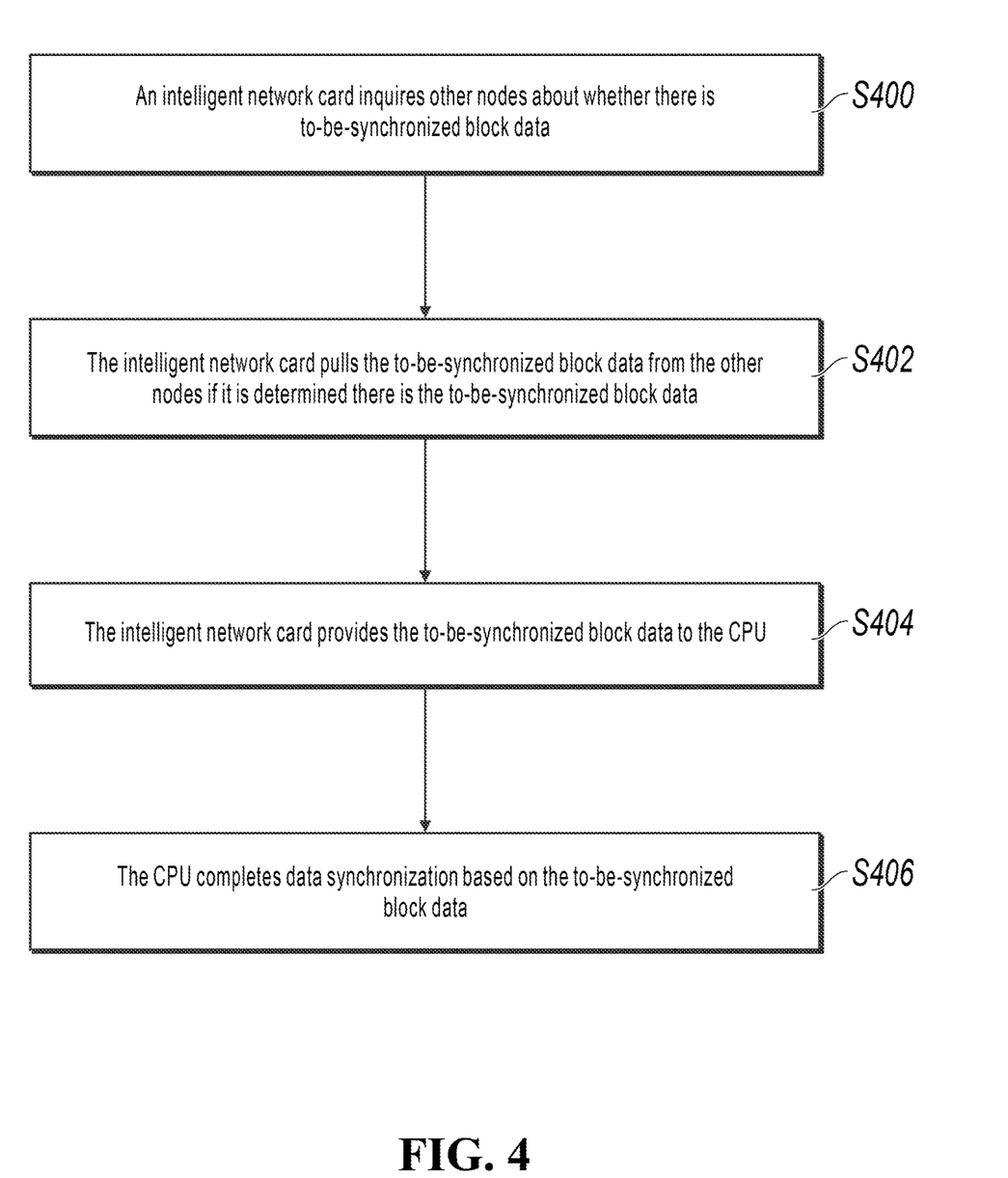
FIG. 4 is a flowchart of a method for synchronizing data based on a blockchain integrated station according to embodiments of the present disclosure.

FIG. 4 is a flowchart of a method for synchronizing data based on a blockchain integrated station according to embodiments of the present disclosure. The method includes the following steps.

At step S400, an intelligent network card inquires other nodes about whether there is to-be-synchronized block data.

Generally, when there is a newly-added node in a blockchain network, the node needs to pull block data from other nodes for synchronization. In addition, in other cases, sometimes the node also needs to pull block data from other nodes, which will not be repeated herein.

To determine whether need to perform data synchronization currently, the node usually needs to frequently inquire other nodes about whether there is to-be-synchronized block data, which will involve frequent I/O operations. In embodiments of the present disclosure, the intelligent network card is in charge of inquiring other nodes about whether there is to-be-synchronized block data, so as to offload this part of operation burden of the CPU, thereby improving the processing efficiency of the CPU.

At step S402, if it is determined that there is to-be-synchronized block data, the intelligent network card pulls the to-be-synchronized block data from other nodes.

After determining that there is to-be-synchronized block data in other nodes, the node needs to pull the to-be-synchronized block data from other nodes. This means that the node needs to maintain a process of pulling data from network and take time to wait for completion of data pulling. If this part of operation is handed over to the intelligent network card for execution, operation burden can also be offloaded for the CPU, thereby improving the operation efficiency of the CPU.

At step S404, the intelligent network card provides the to-be-synchronized block data to the CPU.

Specifically, the intelligent network card can directly send the to-be-synchronized block data to the CPU, or writes the to-be-synchronized block data into a public cache between the intelligent network card and the CPU, and the CPU can obtain the to-be-synchronized block data from the public cache. For example, the CPU can obtain the to-be-synchronized block data from the public cache for data synchronization in an idle time.

At step S406, the CPU completes data synchronization based on the to-be-synchronized block data.

After obtaining the to-be-synchronized block data, the intelligent network card sends the to-be-synchronized block data to the CPU. At this time, the CPU only needs to write the to-be-synchronized block data into a local blockchain of the node without consuming excessive resource and time.

According to the method shown in FIG. 4, a blockchain integrated station includes a CPU and an intelligent network card, and the intelligent network card is a network card having a built-in processor or microprocessor and can perform data computing and processing. The intelligent network card can replace the CPU to actually participate in a blockchain consensus on behalf of the blockchain integrated station, and sends a to-be-executed transaction list to the CPU for transaction execution and transaction chaining based on the present consensus result.

According to the embodiments of the present disclosure, the following technical effects can be achieved by transferring operations such as blockchain consensus that needs frequent network interaction with other nodes from the CPU to the intelligent network card.

1. The intelligent network card is specifically in charge of blockchain consensus, while the CPU focuses on transaction execution and transaction chaining. In this case, the operation efficiency of the blockchain integrated station serving as a node is improved, and the CPU can also execute more transactions within a unit time, thereby improving throughput.

2. In a blockchain consensus process, the network traffic does not need to flow through the CPU but is received by the intelligent network card for direct processing and feedback. Thus, the CPU does not participate in the consensus process, so that the feedback delay of the blockchain integrated station in the consensus process is reduced.

Figure 5:
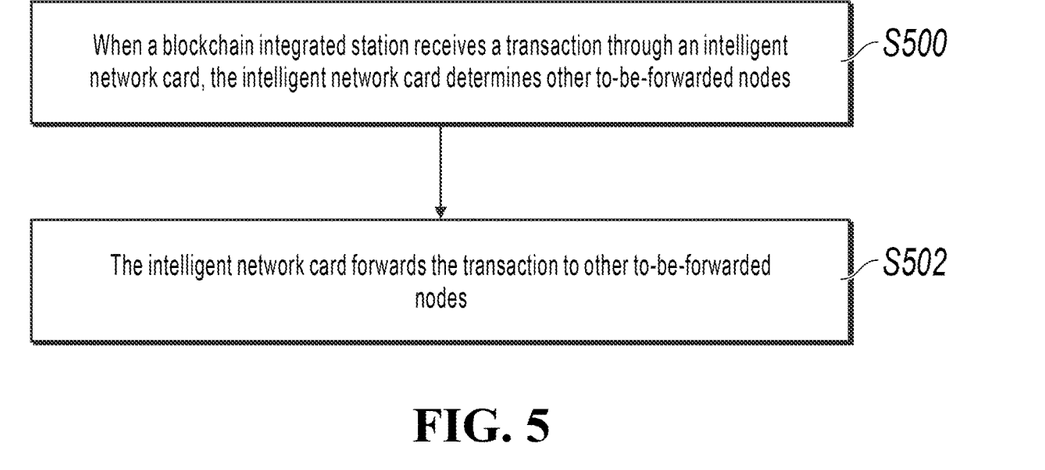
FIG. 5 is a flowchart of a method for forwarding a transaction based on a blockchain integrated station according to embodiments of the present disclosure.

FIG. 5 is a flowchart of a method for forwarding a transaction based on a blockchain integrated station according to embodiments of the present disclosure. The method includes the following steps:

At step S500, when a blockchain integrated station receives a transaction through an intelligent network card, the intelligent network card determines other to-be-forwarded nodes.

At step S502, the intelligent network card forwards the transaction to the other to-be-forwarded nodes.

In the transaction reception stage, in addition to forwarding the received transaction, the intelligent network card can also write the received transaction into a network card cache to implement the method shown in FIG. 3.

Generally, before forwarding and caching the received transaction, the intelligent network card can perform legality verification for the transaction. The legality verification usually involves some legality items to be verified based on a blockchain protocol (for example, signature verification of an account that initiated a transaction).

If the legality verification fails, the intelligent network card generally does not forward the transaction.

The intelligent network card can discard a transaction that fails legality verification. In addition, it should be noted that in an actual application, the intelligent network card can also retain a transaction that fails legality verification, and write the transaction into the network card cache and send the transaction to the CPU for the following reason: when a node unsuccessfully performs legality verification of a transaction, it does not necessarily mean that the transaction is illegal but can mean that the transaction loses part of data in network transmission, or an error may occur to the verification of the node. For a blockchain network as a distributed database, erroneous transaction verification results obtained by a small number of nodes shall not affect the execution of the transaction. Therefore, even if the node unsuccessfully performs verification of a transaction, the node can still retain the transaction which can be subsequently determined as a to-be-executed transaction by the entire network through consensus in the consensus stage.

In addition, in embodiments of the present disclosure, if the intelligent network card successfully performs legality verification of a transaction, the intelligent network card can mark the transaction. Further, the intelligent network card can send the marked transaction to the CPU. Generally, the CPU can determine whether the transaction passes legality verification before writing the transaction into the CPU cache. If the transaction has a mark, it indicates that the intelligent network card already successfully performs verification, and the CPU does not need to perform verification again. If the transaction does not have a mark, it indicates that the intelligent network card unsuccessfully performs verification, and the CPU can choose to record the unsuccessful verification of the transaction, or to perform verification for the transaction again.

According to the method shown in FIG. 5, a blockchain integrated station includes a CPU and an intelligent network card, and the intelligent network card is a network card having a built-in processor or microprocessor and can perform data computing and processing. The intelligent network card can replace the CPU to perform transaction forwarding in the transaction reception stage.

According to the embodiments of the present disclosure, the following technical effects can be achieved by transferring operations such as transaction forwarding that needs frequent network interaction with other nodes from the CPU to the intelligent network card.

1. The intelligent network card is specifically in charge of transaction forwarding to offload this part of operation burden for the CPU. In this case the operation efficiency of the blockchain integrated station serving as the node is improved, and the CPU can also execute more transactions within a unit time, thereby improving throughput.

2. In a blockchain forwarding process, the network traffic does not need to flow through the CPU but is received by the intelligent network card for direct processing and feedback so that the feedback delay of the blockchain integrated station is reduced.

Figure 6:
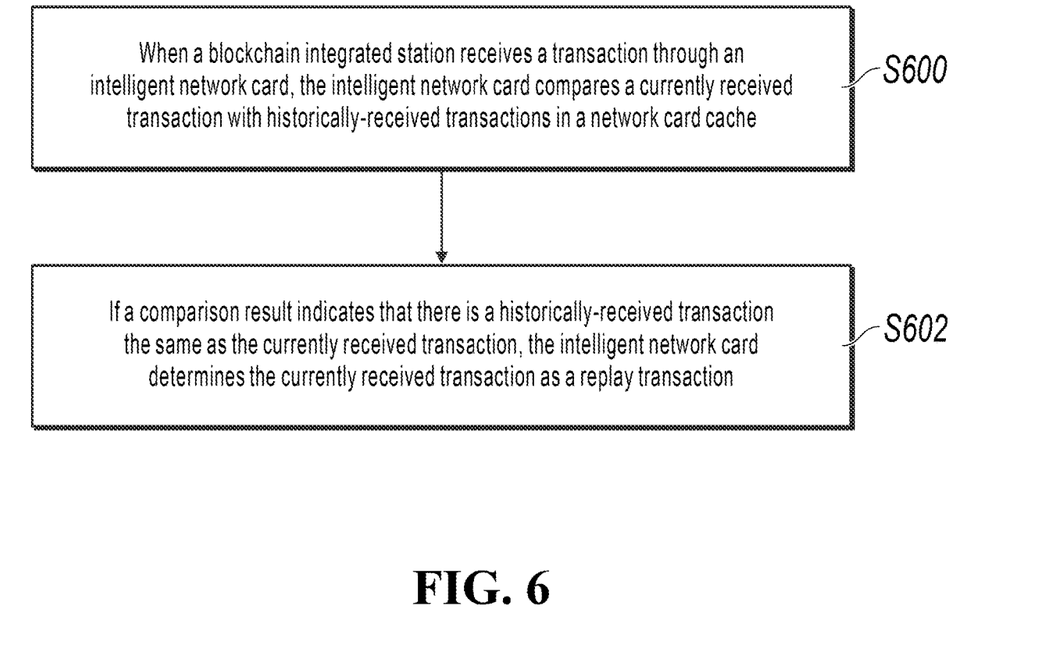
FIG. 6 is a flowchart of a method for identifying a replay transaction based on a blockchain integrated station according to embodiments of the present disclosure.

FIG. 6 is a flowchart of a method for identifying a replay transaction based on a blockchain integrated station according to embodiments of the present disclosure. The method includes the following steps:

At step S600, when a blockchain integrated station receives a transaction through an intelligent network card, the intelligent network card compares the currently received transaction with historically received transactions in a network card cache.

At step S602, if a comparison result indicates that there is a historically received transaction the same as the currently received transaction, the intelligent network card determines the currently received transaction as a replay transaction.

In embodiments of the present disclosure, the intelligent network card can compare the currently received transaction with all historically received transactions one by one to determine whether the currently received transaction is a replay transaction.

In addition, considering that some historically received transactions are too old to be replayed, the currently received transaction can be compared with recent historically received transactions.

Specifically, the intelligent network card can write each received transaction into a transaction identification pool in the network card cache, and obtain the historically received transactions with a reception time length greater than a designated time length from the transaction identification pool. The reception time length refers to a time length between a reception time point and a current time point. The intelligent network card can compare the currently received transaction with the historically received transactions in the transaction identification pool.

Further, in an actual application, a transaction usually has a valid time length. If the time is too long between the current time and the transaction reception time, the transaction will become invalid. It is meaningless to replay those historically received transactions that are too old. Therefore, the above-mentioned designated time length can be specifically set to be no less than a valid time length of a transaction.

In embodiments of the present disclosure, the intelligent network card can classify those identified replay transactions into a replay transaction set. The replay transaction set does not participate in the blockchain consensus, or the replay transaction set is not sent to the CPU. Therefore, the replay transaction can be filtered. In addition, the intelligent network card can also discard the replay transaction.

According to the method shown in FIG. 6, a blockchain integrated station includes a CPU and an intelligent network card, and the intelligent network card is a network card having a built-in processor or microprocessor and can perform data computing and processing. The intelligent network card can replace the CPU to perform replay transaction identification.

According to the embodiments of the present disclosure, the following technical effects can be achieved.

1. The intelligent network card is specifically in charge of identifying a replay transaction to offload this part of operation burden for the CPU. In this case, the operation efficiency of the blockchain integrated station serving as a node is improved and the CPU can also execute more transactions within a unit time, thereby improving throughput.

2. The replay transaction can be identified and filtered at the intelligent network card thus the replay transaction generally will not flow through the CPU, so that the replay transaction can be identified and filtered more rapidly.

Figure 7:
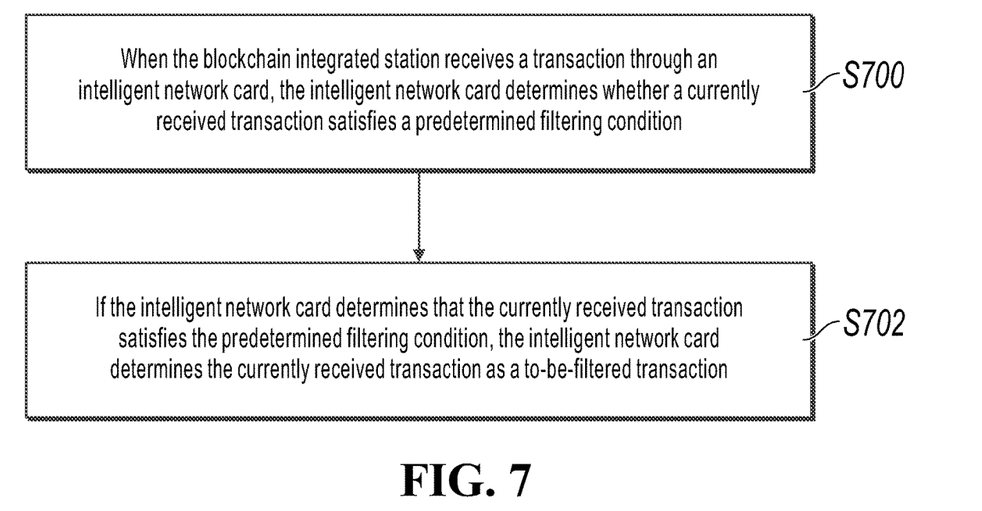
FIG. 7 is a flowchart of a method for identifying a to-be-filtered transaction based on a blockchain integrated station according to embodiments of the present disclosure.

FIG. 7 is a flowchart of a method for identifying a to-be-filtered transaction based on a blockchain integrated station according to embodiments of the present disclosure. The method includes the following steps:

At step S700, when a blockchain integrated station receives a transaction through an intelligent network card, the intelligent network card determines whether the currently received transaction satisfies a predetermined filtering condition.

At step S702, if the intelligent network card determines that the currently received transaction satisfies the predetermined filtering condition, the intelligent network card determines the currently received transaction as a to-be-filtered transaction.

The intelligent network card can discard the identified to-be-filtered transaction, or retain and classify the to-be-filtered transactions into a to-be-filtered transaction set. The to-be-filtered transaction set does not participate in a blockchain consensus, or is not sent to the CPU. Therefore, the to-be-filtered transaction can be filtered.

In addition, the to-be-filtered transactions mainly involve the following two cases:

1. A service operation type corresponding to a service operation realized by a transaction is not a service operation type in charge of the present node (the blockchain integrated station), nor belong to a service operation type set corresponding to the present node. For example, due to limited transaction processing capability, the present node will only selectively execute transactions of some specific service operation types. For another example, some service operation types are written into a blacklist of the present node, and the present node refuses to execute the transactions of these service operation types based on the blacklist.

In addition, it should be noted that for a blockchain network of such distributed architecture, failure of a small number of nodes to execute some transactions will not affect a world state of the entire blockchain network, and the world state will still be synchronized to each node.

2. A service operation type corresponding to a service operation realized by a transaction is a service operation type in charge of the present node, and belongs to a service operation type set corresponding to the present node. However, specific service operation content realized by the transaction are illegal, nor belong to legal operation content corresponding to the service operation type. For example, a transaction is used to realize a query operation, but the query operation is specifically used to perform repeated meaningless queries for a particular parameter value, and therefore the transaction actually belongs to an attack transaction for a blockchain network and is illegal. For another example, a transaction is used to perform a transfer operation but the balance of the transferor is insufficient, and the transaction is also illegal. For another example, an account of a transaction initiator has no operation authority, and thus the transaction is also illegal.

In addition, according to the method shown in FIG. 7, a more complex filtering condition can be configured for the intelligent network card. For example, the following filtering condition can be configured:

(a particular time period) and (initiated by account A) and (sending to account B or C for operation).

According to the method shown in FIG. 7, a blockchain integrated station includes a CPU and an intelligent network card, and the intelligent network card is a network card having a built-in processor or microprocessor and can perform data computing and processing. The intelligent network card can replace the CPU to perform to-be-filtered transaction identification.

According to the embodiments of the present disclosure, the following technical effects can be achieved.

1. The intelligent network card is specifically in charge of identifying a to-be-filtered transaction to offload this part of operation burden for the CPU. In this case, the operation efficiency of the blockchain integrated station serving as the node is improved and the CPU can also execute more transactions within a unit time, thereby improving throughput.

2. The to-be-filtered transaction can be identified and filtered at the intelligent network card and thus the to-be-filtered transaction generally will not flow through the CPU, so that the to-be-filtered transaction is identified and filtered more rapidly.

Figure 8:
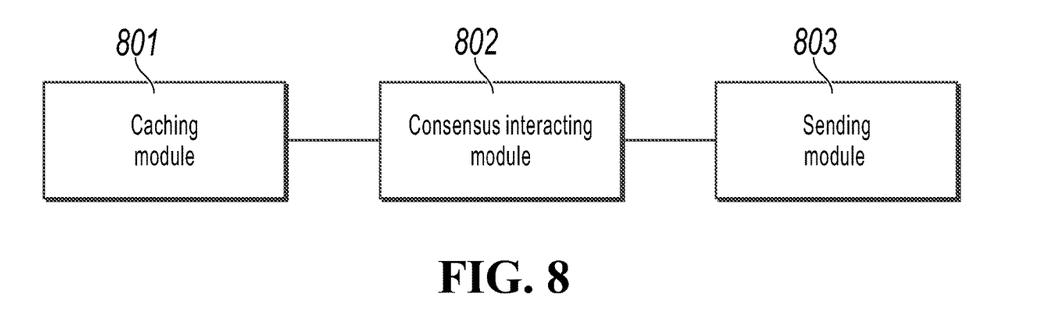
FIG. 8 is a structural schematic diagram of an apparatus for processing a transaction based on a blockchain integrated station according to embodiments of the present disclosure.

FIG. 8 is a structural schematic diagram of an apparatus for processing a transaction based on a blockchain integrated station according to embodiments of the present disclosure. The apparatus is applied to an intelligent network card of the blockchain integrated station, and the blockchain integrated station further includes a CPU and is any node of a blockchain network. The apparatus includes:

a caching module 801, configured to, when the blockchain integrated station receives a transaction through the intelligent network card, write the received transaction into a network card cache;

a consensus interacting module 802, configured to perform consensus interaction with other nodes of the blockchain network based on the transaction in the network card cache when the blockchain integrated station participates in a blockchain consensus; and a sending module 803, configured to determine a to-be-executed transaction list according to the consensus result and send the to-be-executed transaction list to the CPU.

Figure 9:
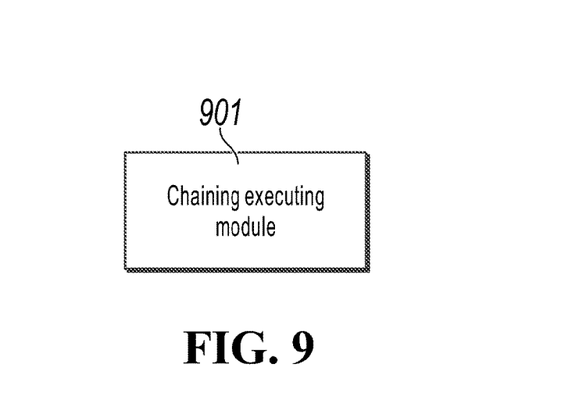
FIG. 9 is a structural schematic diagram of an apparatus for processing a transaction based on a blockchain integrated station according to embodiments of the present disclosure.

FIG. 9 is a structural schematic diagram of an apparatus for processing a transaction based on a blockchain integrated station according to embodiments of the present disclosure. The apparatus is applied to a CPU of the blockchain integrated station, and the blockchain integrated station further includes an intelligent network card and is any node of a blockchain network. The apparatus includes:

a chaining executing module 901, configured to execute a transaction based on the to-be-executed transaction list sent by the intelligent network card and complete transaction chaining.

Figure 10:
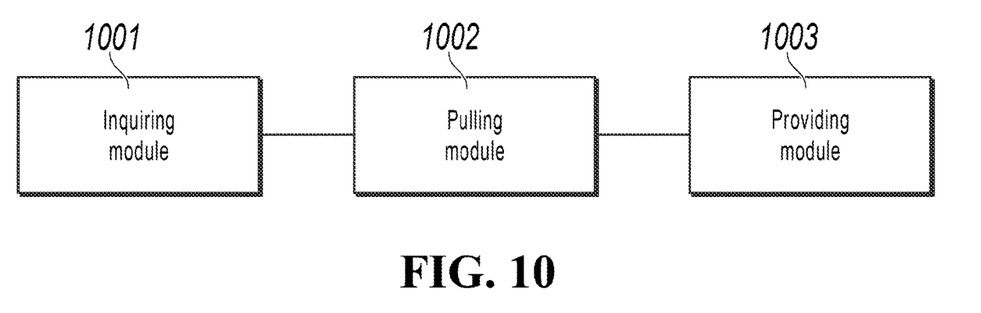
FIG. 10 is a structural schematic diagram of an apparatus for synchronizing data based on a blockchain integrated station according to embodiments of the present disclosure.

FIG. 10 is a structural schematic diagram of an apparatus for synchronizing data based on a blockchain integrated station according to embodiments of the present disclosure. The apparatus is applied to an intelligent network card of the blockchain integrated station, and the blockchain integrated station further includes a CPU and is any node of a blockchain network. The apparatus includes:

an inquiring module 1001, configured to inquire other nodes about whether there is to-be-synchronized block data;

a pulling module 1002, configured to pull the to-be-synchronized block data from other nodes if it is determined that there is the to-be-synchronized block data; and a providing module 1003, configured to provide the to-be-synchronized block data to the CPU.

Figure 11:
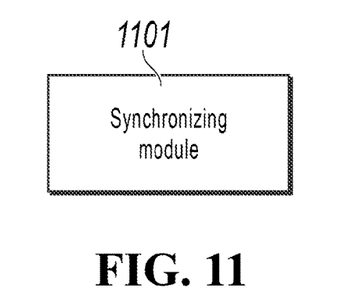
FIG. 11 is a structural schematic diagram of an apparatus for synchronizing data based on a blockchain integrated station according to embodiments of the present disclosure.

FIG. 11 is a structural schematic diagram of an apparatus for synchronizing data based on a blockchain integrated station according to embodiments of the present disclosure. The apparatus is applied to a CPU of the blockchain integrated station, and the blockchain integrated station further includes an intelligent network card and is any node of a blockchain network. The apparatus includes:

a synchronizing module 1101, configured to complete data synchronization based on the to-be-synchronized block data.

Figure 12:
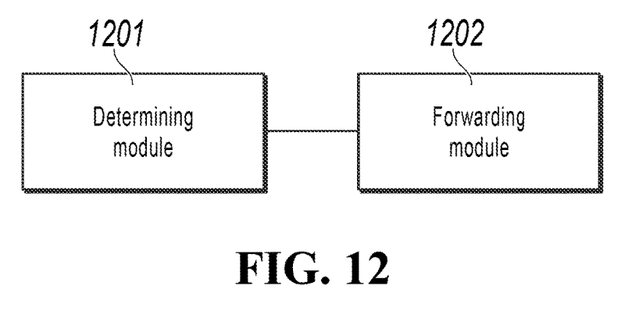
FIG. 12 is a structural schematic diagram of an apparatus for forwarding a transaction based on a blockchain integrated station according to embodiments of the present disclosure.

FIG. 12 is a structural schematic diagram of an apparatus for forwarding a transaction based on a blockchain integrated station according to embodiments of the present disclosure. The apparatus is applied to an intelligent network card of the blockchain integrated station, and the blockchain integrated station further includes a CPU and is any node of a blockchain network. The apparatus includes:

a determining module 1201, configured to determine other to-be-forwarded nodes when the blockchain integrated station receives a transaction through the intelligent network card; and a forwarding module 1202, configured to forward the transaction to the other to-be-forwarded nodes.

Figure 13:
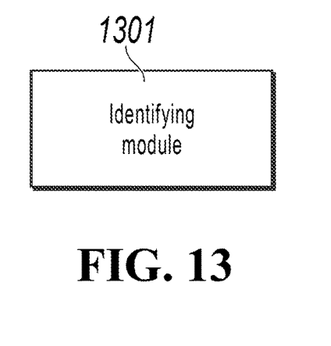
FIG. 13 is a structural schematic diagram of an apparatus for identifying a replay transaction based on a blockchain integrated station according to embodiments of the present disclosure.

FIG. 13 is a structural schematic diagram of an apparatus for identifying a replay transaction based on a blockchain integrated station according to embodiments of the present disclosure. The apparatus is applied to an intelligent network card of the blockchain integrated station, and the blockchain integrated station further includes a CPU and is any node of a blockchain network. The apparatus includes:

an identifying module 1301, configured to, when the blockchain integrated station receives a transaction through the intelligent network card, identify the currently received transaction, including: comparing the currently received transaction with historically received transactions in a network card cache; and if a comparison result indicates that there is a historically received transaction the same as the currently received transaction, determining the currently received transaction as a replay transaction.

Figure 14:
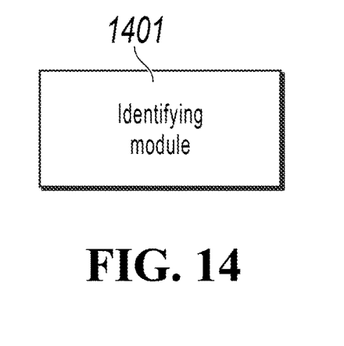
FIG. 14 is a structural schematic diagram of an apparatus for identifying a to-be-filtered transaction based on a blockchain integrated station according to embodiments of the present disclosure.

FIG. 14 is a structural schematic diagram of an apparatus for identifying a to-be-filtered transaction based on a blockchain integrated station according to embodiments of the present disclosure. The apparatus is applied to an intelligent network card of the blockchain integrated station, and the blockchain integrated station further includes a CPU and is any node of a blockchain network. The apparatus includes:

an identifying module 1401, configured to, when the blockchain integrated station receives a transaction through the intelligent network card, identify the currently received transaction, including: determining whether the currently received transaction satisfies a predetermined filtering condition; and if it is determined that the currently received transaction satisfies the predetermined filtering condition, determining the currently received transaction as a to-be-filtered transaction.

Embodiments of the present disclosure further provide a computer device including at least memory, a CPU, an intelligent network card, and computer programs that are stored on the memory and run on the intelligent network card. When executing the programs, the intelligent network card implements the functions of each method in the present disclosure.

Figure 15:
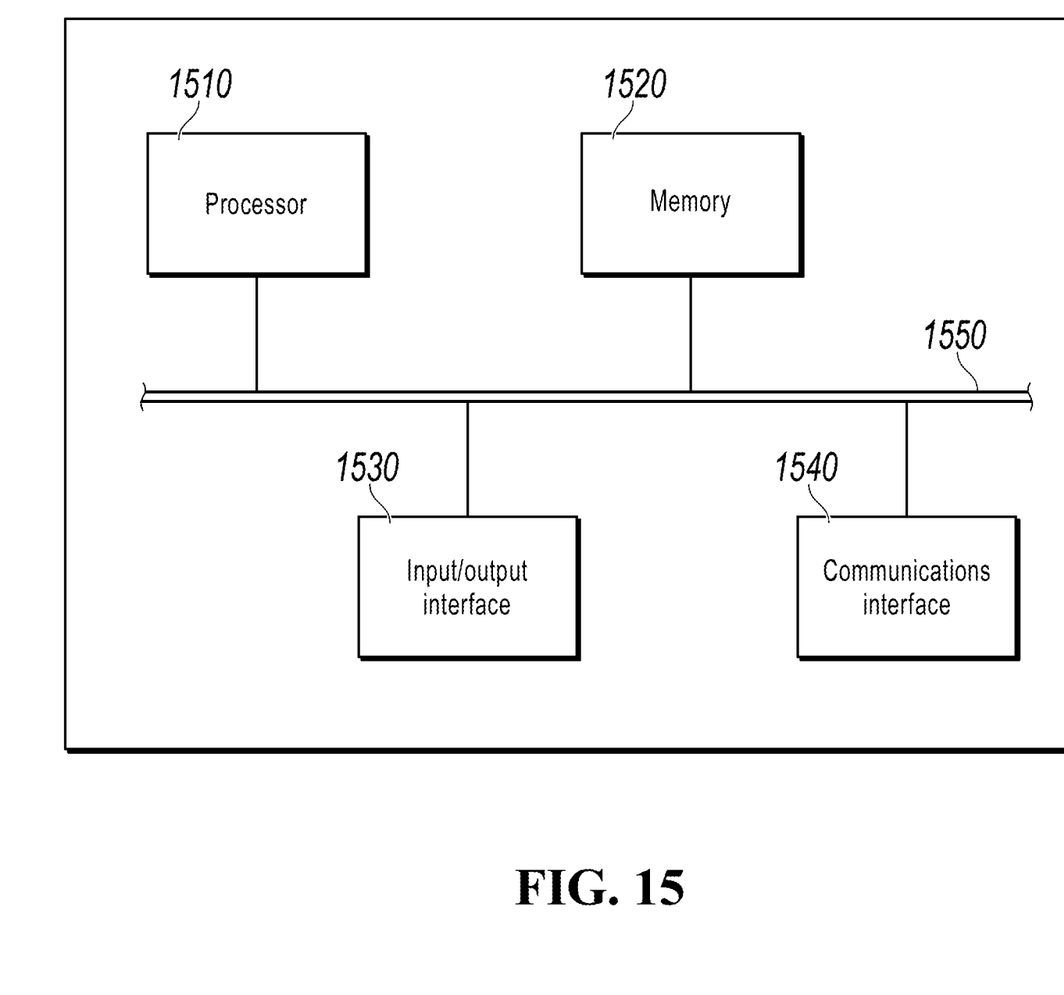
FIG. 15 is a structural schematic diagram of a computer device for configuring a method of embodiments of the present disclosure.

FIG. 15 is a structural schematic diagram of more specific computer hardware according to embodiments of the present disclosure. The device can include: a processor 1510, a memory 1520, an input/output interface 1530, a communication interface 1540 and a bus 1550. The processor 1510, the memory 1520, the input/output interface 1530 and the communication interface 1540 realize communication connection with each other in the device through the bus 1550.

The processor 1510 can be implemented by a general central processing unit (CPU), a microprocessor, an application specific integrated circuit (ASIC), or one or more integrated circuits, or the like to execute relevant programs, so as to implement the technical solutions according to the embodiments of the present disclosure.

The memory 1520 can be implemented by a read only memory (ROM), a random access memory (RAM), a static storage device, a dynamic storage device, or the like. The memory 1520 can store an operating system and other application programs. When the technical solutions according to the embodiments of the present disclosure are implemented by software or firmware, relevant program codes stored in the memory 1520 are invoked and executed by the processor 1510.

The input/output interface 1530 is used to connect an inputting/outputting module, so as to realize information input and output. The inputting/outputting module can be configured as a component (not shown) in the device, or can be externally connected to the device to provide corresponding functions. The input device can include a keyboard, a mouse, a touch screen, a microphone, various sensors, and the like, and the output device can include a display, a speaker, a vibrator, an indicator light, and the like.

The communication interface 1540 is used to connect a communication module (not shown), so as to realize communication interaction between the device and other devices. The communication module can realize communication in a wired manner (such as a USB and a network cable) or in a wireless manner (such as a mobile network, WIFI and Bluetooth).

The bus 1550 includes a channel transmitting information between different components (such as the processor 1510, the memory 1520, the input/output interface 1530 and the communication interface 1540) of the device.

It should be noted that although the above-mentioned device only shows the processor 1510, the memory 1520, the input/output interface 1530, the communication interface 1540 and the bus 1550, the device can further include other components needed for normal operation in a specific implementation process. In addition, persons skilled in the art can understand that the above-mentioned device can only include components needed for the solution according to the embodiments of the present disclosure, rather than all components shown in the drawings.

Embodiments of the present disclosure further provide a computer readable storage medium storing computer programs, and the programs are executed by an intelligent network card to implement functions of each method in the present disclosure.

The computer readable medium includes permanent, non-permanent, mobile and non-mobile media, which can realize information storage by any method or technology. The information can be computer readable instructions, data structures, program modules and other data. Embodiments of the computer storage medium include but not limited to: a phase change random access memory (PRAM), a Static Random Access Memory (SRAM), a Dynamic Random Access Memory (DRAM), and other types of RAMs, Read-Only Memories (ROM), Electrically-Erasable Programmable Read-Only Memories (EEPROM), Flash Memories, or other memory technologies, CD-ROMs, digital versatile discs (DVD) or other optical storages, cassette type magnetic tapes, magnetic disk storages, or other magnetic storage devices or any other non-transmission mediums for storing information accessible by computing devices. According to the definition of the specification, the computer readable medium does not include transitory computer readable media, such as modulated data signals and carriers.

It can be known from descriptions of the above-mentioned embodiments that persons skilled in the art can clearly understand that the embodiments of the present disclosure can be implemented by means of software and a necessary general hardware platform. Based on such understanding, the technical solutions of embodiments of the present disclosure essentially or a part contributing to the exited technology can be embodied in the form of a software product, and the computer software product can be stored in a storage medium, such as a ROM/RAM, a diskette or a compact disk, and includes several instructions for enabling a computer device (such as a personal computer, a server or a network device) to execute the methods of different embodiments or some parts of the embodiments of the present disclosure.

The systems, methods, modules or units described in the above-mentioned embodiments can be specifically implemented by a computer chip or an entity, or can be implemented by a product with a particular function. A typical implementing device can be a computer, and the computer can specifically be a personal computer, a laptop computer, a cellular phone, a camera phone, a smart phone, a personal digital assistant, a media player, a navigation device, an email transceiver, a game console, a tablet computer, a wearable device, or a combination of any several devices of the above-mentioned devices.

The embodiments in the present disclosure are described in a progressive manner, each embodiment focuses on differences from other examples, and same or similar parts among the embodiments can be referred to each other. Especially, since apparatus embodiments are basically similar to method embodiments, simple descriptions are made to the apparatus embodiments, and relevant parts can be referred to part of the descriptions of the method embodiments. The apparatus embodiments described above are merely illustrative, where modules described as separate members can be or does not have to be physically separated, and functions of different modules can be implemented in the same or several software and/or hardware during implementation of the embodiments of the present disclosure. Part or all of the modules can also be selected according to actual needs to achieve the objectives of the solution of the embodiment. Persons of ordinary skill in the art can understand and implement the solutions without creative work.

The above-mentioned descriptions are merely specific embodiments of the present disclosure. It should be noted that persons of ordinary skill in the art can also make several improvements and modifications without departing from the principles of the embodiments of the present disclosure, and these improvements and modifications shall also be included in the scope of protection of embodiments of the present disclosure.

What is claimed is:

1. A blockchain integrated station, comprising:
   a central processing unit (CPU); and
   an intelligent network card, wherein the intelligent network card comprises a processor different from the CPU, the intelligent network card is coupled with one or more caches, the blockchain integrated station serves as a blockchain node of a blockchain network, and the intelligent network card is configured to:
   receive a transaction of the blockchain network;
   write each received transaction into a transaction identification pool in the one or more caches; and
   identify the transaction as a replay transaction by operations comprising:
      identifying historically received transactions from the transaction identification pool, wherein each of the historically received transactions has a reception time duration greater than a designated time duration, and the reception time duration is a time duration between a current time point and a reception time point of the each of the historically received transactions;
      comparing the transaction with the historically received transactions in the transaction identification pool; and
      in response to a comparison result indicating that the transaction is the same as one of the historically received transactions, determining the transaction as a replay transaction.

2. The blockchain integrated station according to claim 1, wherein the replay transaction does not participate in a blockchain consensus, or the replay transaction is not sent to the CPU.

3. The blockchain integrated station according to claim 1, wherein the designated time duration is no less than a valid time duration of a transaction.

4. The blockchain integrated station according to claim 1, wherein the intelligent network card is configured to classify the replay transaction into a replay transaction set, wherein the replay transaction set does not participate in a blockchain consensus, or the replay transaction set is not sent to the CPU.

5. The blockchain integrated station according to claim 1, wherein the one or more caches are one or more network card caches, the CPU is coupled with one or more CPU caches, and the intelligent network card is configured to:
   write one or more transactions into the one or more network card caches; and
   perform subsequent blockchain consensus based on the one or more transactions in the one or more network card caches.

6. The blockchain integrated station according to claim 1, wherein the processor of the intelligent network card comprises a build-in processor or microprocessor.

7. The blockchain integrated station according to claim 1, further comprising one or more of a smart contract processing chip or a cryptographic acceleration card.

8. A blockchain system, comprising one or more blockchain nodes of a blockchain network, wherein at least one of the one or more blockchain nodes is implemented using a blockchain integrated station, wherein the blockchain integrated station comprising:
   a central processing unit (CPU); and
   an intelligent network card, wherein the intelligent network card comprises a processor different from the CPU, the intelligent network card is coupled with one or more caches, the blockchain integrated station serves as a blockchain node of the blockchain network, and the intelligent network card is configured to:
   receive a transaction of the blockchain network;
   write each received transaction into a transaction identification pool in the one or more caches; and
   identify the transaction as a replay transaction by operations comprising:
      identifying historically received transactions from the transaction identification pool, wherein each of the historically received transactions has a reception time duration greater than a designated time duration, and the reception time duration is a time duration between a current time point and a reception time point of the each of the historically received transactions;
      comparing the transaction with the historically received transactions in the transaction identification pool; and
      in response to a comparison result indicating that the transaction is the same as one of the historically received transactions, determining the transaction as a replay transaction.

9. The blockchain system according to claim 8, wherein the replay transaction does not participate in a blockchain consensus, or the replay transaction is not sent to the CPU.

10. The blockchain system according to claim 8, wherein the designated time duration is no less than a valid time duration of a transaction.

11. The blockchain system according to claim 8, wherein the intelligent network card is configured to classify the replay transaction into a replay transaction set, wherein the replay transaction set does not participate in a blockchain consensus, or the replay transaction set is not sent to the CPU.

12. The blockchain system according to claim 8, wherein the one or more caches are one or more network card caches, the CPU is coupled with one or more CPU caches, and the intelligent network card is configured to:

write one or more transactions into the one or more network card caches; and perform subsequent blockchain consensus based on the one or more transactions in the one or more network card caches.

13. The blockchain system according to claim 8, wherein the processor of the intelligent network card comprises a build-in processor or microprocessor.

14. The blockchain system according to claim 8, wherein the blockchain integrated station further comprises one or more of a smart contract processing chip or a cryptographic acceleration card.

15. A computer-implemented method, comprising:
receiving, by an intelligent network card of a blockchain integrated station that serves as a blockchain node of a blockchain network, a transaction of the blockchain network, wherein the blockchain integrated station comprises a central processing unit (CPU) and the intelligent network card, and the intelligent network card comprises a processor different from the CPU;

writing, by the intelligent network card of the blockchain integrated station, each received transaction into a transaction identification pool in the one or more caches; and identifying, by the intelligent network card of the blockchain integrated station, the transaction as a replay transaction by operations comprising:
identifying, by the intelligent network card of the blockchain integrated station, historically received transactions from the transaction identification pool, wherein each of the historically received transactions has a reception time duration greater than a designated time duration, and the reception time duration is a time duration between a current time point and a reception time point of the each of the historically received transactions;

comparing, by the intelligent network card of the blockchain integrated station, by the intelligent network card of the blockchain integrated station, the transaction with the historically received transactions in the transaction identification pool; and in response to a comparison result indicating that the transaction is the same as one of the historically received transactions, determining, by the intelligent network card of the blockchain integrated station, the transaction as a replay transaction.

16. The computer-implemented method according to claim 15, wherein the replay transaction does not participate in a blockchain consensus, or the replay transaction is not sent to the CPU.

17. The computer-implemented method according to claim 15, further comprising classifying, by the intelligent network card of the blockchain integrated station, the replay transaction into a replay transaction set, wherein the replay transaction set does not participate in a blockchain consensus, or the replay transaction set is not sent to the CPU.

18. The computer-implemented method according to claim 15, wherein the one or more caches are one or more network card caches, the CPU is coupled with one or more CPU caches, and the computer-implemented method further comprises:
writing, by the intelligent network card of the blockchain integrated station, one or more transactions into the one or more network card caches; and performing, by the intelligent network card of the blockchain integrated station, subsequent blockchain consensus based on the one or more transactions in the one or more network card caches.

19. The computer-implemented method according to claim 15, wherein the processor of the intelligent network card comprises a build-in processor or microprocessor.

20. The computer-implemented method according to claim 15, wherein the blockchain integrated station further comprises one or more of a smart contract processing chip or a cryptographic acceleration card.

\* \* \* \* \*